UNITED STATES PATENT OFFICE.

GEORG BRAUN, OF MUNICH, AND HERMANN V. LUITHLEN AND WALTER NEUMANN, OF ANDERNACH, GERMANY.

PRODUCTION OF SOUP OR BROTH-LIKE SUBSTANCES OR LIQUIDS.

1,073,392.  Specification of Letters Patent. Patented Sept. 16, 1913.

No Drawing. Application filed October 24, 1912. Serial No. 727,541.

*To all whom it may concern:*

Be it known that we, GEORG BRAUN, of Munich, and HERMANN V. LUITHLEN and WALTER NEUMANN, of Andernach, Germany, subjects of the German Empire, have invented new and useful Improvements in or Relating to the Production of Soup or Broth-Like Substances or Liquids, of which the following is a specification.

It is a fact, which has been known for a long time, that a decomposition of the complicated albumin molecules into a series of more simple compounds, the first elements of which form the albumoses and peptones and the last of which form the acid-amids, takes place upon a hydrolytic clearing of the albumins whether this be effected by a simple proteolysis with water, or by means of acids or ferments. Statements on the subject are also to be found in treatises to the effect that during this hydrolytic clearing there arise, at a certain stage in the process of decomposition, bodies which possess a decided smell and taste resembling that of extract of meat. As, however, the effect of water and the proteolytic enzym upon the great resistance of the albumin molecule is too slow, the hydrolytic action has been obtained by the use of mineral acids, particularly hydrochloric or sulfuric acids. The effect of these two acids upon albumin, nevertheless, is different in two ways. Whereas albumin is easily soluble in hydrochloric acid, it strongly resists the attack of sulfuric acid. In order therefore to reach the selfsame stage in the process of decomposition, it is necessary, when sulfuric acid is used for the hydrolysis, to apply heat for a longer period than in the case of hydrolysis by means of hydrochloric acid. But a relative difference in the matter of taste is also exhibited. Whereas in the case of hydrolysis with hydrochloric acid bodies similar to meat extract are formed in a relatively large quantity, but nevertheless with a less pronounced meat taste, proteolysis by means of sulfuric acid yields, on the other hand, products similar to meat extract having a most pronounced taste and smell but nevertheless in a lesser quantity. Having regard to those facts a process for the production of bodies having a smell and taste as of meat broth or beef tea has been built up thereupon and forms the subjectmatter of the present application. It is based not on the employment, for the hydrolytic splitting up of albumin, of hydrochloric acid or sulfuric acid, each by itself, but on the combined effect of the two acids together upon the albumin. By the combined operation upon the albumin of hydrochloric and sulfuric acids not only is the albumin easily dissolved, but the hydrolysis by hydrochloric and sulfuric acids further exhibits the property of combining the advantages of hydrolysis by means of hydrochloric acid with those of hydrolysis by means of sulfuric acid without exhibiting the disadvantages, either quantitative or qualitative, of either one of these processes of decomposition.

In practice the process is carried out in the following manner:—A mixture of hydrochloric and sulfuric acids is heated in an acid-proof vessel up to boiling point, or approximately to the boiling point, whereupon dry albumin, for example casein, is introduced, with stirring, into the mixture of acids. After a short time a darkening in color and dissolving of the albumin takes place and by a continuance of the heating the albumin is decomposed into its simpler component parts. The more concentrated the mixture of hydrochloric and sulfuric acids the more easily does the decomposition of the albumin proceed. The period of heating is therefore not constant but varies according to the strength of the acids employed. In practice, the proper moment in the process of decomposition, viz. that in which a maximum of products of decomposition similar to meat extract is present is easily recognized by the characteristic smell given off at that moment. At this stage in the process of decomposition the process is interrupted. The sulfuric acid is neutralized and separated out, by the addition of compounds of the alkaline earths metals, such as barium, calcium or strontium, as an insoluble sulfate of one of these elements, while the hydrochloric acid is converted into cooking salt, which remains in the solution, by the addition of sodium-hydroxid or carbonic acid compounds of sodium. After completion of the neutralization of both acids, the residue which has not been dissolved during the process of decomposition is separated by filtration from the solution containing the cooking salt and the bodies similar to meat extract. This solution can then be employed in fluid form as a flavoring for soup or in a firm condition as a substitute for meat extract.

Example: 18 kilograms of water containing 3 kilograms hydrochloric acid in gas form are placed in an earthenware boiling vessel. To this mixture is added 1.5 kilograms of concentrated sulfuric acid of 1.84 specific gravity and the mixture of hydrochloric and sulfuric acids is then heated to approximately boiling point. Albumin, for example air-dried animal casein, is now added. The introduction of the casein must take place during constant stirring, so as to be intimately mixed with and penetrated by the mixture of acids. After a short time swelling and decomposition of the casein takes place, with a violet and brown tinting of the mass. After the hydrochloric and sulfuric acids have worked upon the casein for about 15-20 hours under heat, the breaking down process will have progressed to the desired stage. The heating process is therefore interrupted and the sulfuric acid is separated out by the addition of compounds of the alkaline earth metals (calcium, strontium and barium) for example, chlorid of barium. This is effected by the addition of 3.2 kilograms of chlorid of barium, free from water, which is introduced while the mixture is being stirred. After elimination of the sulfuric acid, this mixture contains in fluid solution only free hydrochloric acid apart from the products due to decomposition of the casein. By the addition of compounds of sodium, for example of 6 kilograms of carbonate of soda, free from water, the conversion of the free hydrochloric acid into cooking salt, water and carbonic acid is effected. While the last-named passes off, forming an indicator for terminating the neutralizing process, the cooking salt formed remains in solution and combined with the products of decomposition of the casein, which have the taste of meat. As during the process of decomposition all the casein is not dissolved the residue is filtered off from the solution. The solution is then allowed to cool down and to stand some days until it becomes clear, after which it can be employed in a fluid or concentrated form as a flavoring for soup, or as a substitute for extract of meat.

Having now particularly described and ascertained the nature of our said invention and in what manner the same is to be performed, we declare that what we claim is:—

A process for the production of substances in fluid condition having a smell and taste similar to that of meat broth, or soup, in which material containing albumin is heated in a mixture of hydrochloric acid and sulfuric acid up to approximately the limit of complete hydrolytic decomposition, whereupon the process of decomposition is interrupted, the sulfuric acid is eliminated by the addition of compounds of earth alkalis such as barium, strontium or calcium, in the form of insoluble sulfate and the hydrochloric acid is converted into a solution of cooking salt by the addition of compounds of sodium.

In testimony whereof we have signed our names to this specification in the presence of two subscribing witnesses.

GEORG BRAUN.
HERMANN V. LUITHLEN.
WALTER NEUMANN.

Witnesses for Georg Braun:
  A. V. W. COTTER,
  MATHILDE K. HELD.

Witnesses for H. V. Luithlen and Walter Neumann:
  LOUIS VANDORN,
  OSCAR DEPNER.